United States Patent
Yildirim et al.

(10) Patent No.: US 8,501,030 B2
(45) Date of Patent: Aug. 6, 2013

(54) METHODS FOR PURIFYING KAOLIN CLAYS USING REVERSE FLOTATION, HIGH BRIGHTNESS KAOLIN PRODUCTS, AND USES THEREOF

(75) Inventors: Ismail Yildirim, Milledgeville, GA (US); Mikel Dean Smith, Tennille, GA (US); Robert Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 109 days.

(21) Appl. No.: 12/920,476

(22) PCT Filed: Mar. 6, 2009

(86) PCT No.: PCT/US2009/036285
§ 371 (c)(1),
(2), (4) Date: Sep. 1, 2010

(87) PCT Pub. No.: WO2009/114404
PCT Pub. Date: Sep. 17, 2009

(65) Prior Publication Data
US 2011/0001078 A1    Jan. 6, 2011

Related U.S. Application Data

(60) Provisional application No. 61/035,003, filed on Mar. 9, 2008.

(51) Int. Cl.
*B03D 1/02*    (2006.01)
*C09C 1/42*    (2006.01)

(52) U.S. Cl.
USPC .......................................... 252/61; 160/486

(58) Field of Classification Search
USPC ...... 210/704, 703; 106/486; 252/61; 501/145
See application file for complete search history.

(56) References Cited

U.S. PATENT DOCUMENTS

| | | | |
|---|---|---|---|
| 4,372,843 A | | 2/1983 | Lawver et al. |
| 4,523,991 A | * | 6/1985 | Meyer et al. ............... 209/166 |
| 5,011,534 A | * | 4/1991 | Berube et al. ............... 106/416 |
| 5,526,675 A | | 6/1996 | Ratton |
| 5,883,029 A | | 3/1999 | Castle |
| 6,526,675 B1 | | 3/2003 | Yoon |
| 2005/0107624 A1 | * | 5/2005 | Lin et al. ....................... 554/174 |
| 2006/0151397 A1 | * | 7/2006 | Wright et al. ................. 210/704 |
| 2008/0017552 A1 | | 1/2008 | Wright et al. |
| 2008/0029460 A1 | | 2/2008 | Wright et al. |

FOREIGN PATENT DOCUMENTS

| | | |
|---|---|---|
| WO | WO 92/11091 | 7/1992 |
| WO | WO 00/51941 | 9/2000 |
| WO | WO 2009/114404 A2 | 9/2009 |

OTHER PUBLICATIONS

Mathur, Sharad,"Kaolin Flotation"; Journal of Colloid and Interface Science 256, Elsevier Science, 2002, pp. 153-158.
Pruett, Robert J., and Pickering, Jr., Sam M., "Clays—Kaolin", Industrial Minerals and Rocks, $7^{th}$ ed., Society for Mining, Metallurgy, and Exploration, pp. 383-399.
Raghavan, Sathy P. et al., "Value addition of paper coating grade kaolins by the removal of ultrafine coloring impurities", International Journal of Mineral Processing, vol. 50, Issue 4, Sep. 1997, pp. 307-316.
Miller, J., Tippin, B., and Pruett, R.; "Nonsulfide Flotation Technology and Plant Practice", Mineral Processing Plant Design, Practice and Control, vol. 1, The Society for Mining, Metallurgy and Exploration, Little, Colorado, pp. 1159-1178.
International Search Report and Written Opinion issued Apr. 22, 2009, for International Application No. PCT/US2009/036285.

* cited by examiner

*Primary Examiner* — Pegah Parvini
(74) *Attorney, Agent, or Firm* — Finnegan, Henderson, Farabow, Garrett & Dunner, L.L.P.

(57) ABSTRACT

Disclosed herein are methods for removing discoloring impurities, such as carbon impurities, particularly graphite, from kaolin clay to enhance the brightness of the kaolin clays. The methods include reverse flotation processes. Also disclosed herein are high brightness kaolin products, and the uses thereof.

18 Claims, No Drawings

METHODS FOR PURIFYING KAOLIN CLAYS USING REVERSE FLOTATION, HIGH BRIGHTNESS KAOLIN PRODUCTS, AND USES THEREOF

CLAIM OF PRIORITY

This application is a U.S. national stage entry under 35 U.S.C. §371 from PCT International Application No. PCT/US2009/036285, filed Mar. 6, 2009, which claims priority to and the benefit of the filing date of U.S. Provisional Application No. 61/035,003, filed Mar. 9, 2008, to both of which this application claims the benefit of priority, and the entirety of the subject matter of both of which is incorporated herein by reference.

FIELD OF THE INVENTION

This application and the inventions described herein generally discuss and relate to using reverse flotation to remove discoloring impurities, such as graphite, from particulate aqueous slurries, such as kaolin clays.

BACKGROUND OF THE INVENTION

Kaolin clay, also referred to as china clay or hydrous kaolin, predominately comprises the mineral kaolinite ($Al_2Si_2O_5(OH)_4$), a hydrous aluminum silicate, and small amounts of various impurities, such as quartz, micas, smectite, graphite, iron oxides, iron sulfides, and/or titania-based impurities. Large deposits of kaolin clay exist in Brazil (e.g., in Rio Capim), in England (e.g., in Devon and Cornwall), in the United States (e.g., in Georgia and South Carolina), in Australia, and in several other countries. Kaolin is generally known as a white inorganic pigment existing naturally as and beneficiated from kaolin clay.

Although kaolin clay may be used as an inert filler where product specifications are not very rigid, a large quantity of kaolin clay is converted to kaolin products where restrictive specifications apply. Those specifications set limits on properties such as viscosity in water suspensions, particle size distribution, color, brightness, etc. The term "brightness" refers to the reflectance of the product to blue light. Since even the brightest commercial kaolins have a somewhat yellowish color, the blue reflectance (or brightness) is a reasonably good measure of their nearness to more perfectly white material. Impurities (sometimes called gangue), such as graphite, generally discolor the kaolin products and/or reduce their brightness. and ozone bleaching, that are used in the kaolin industry to remove discoloring impurities that result in improving the brightness of kaolin. The present disclosure generally relates to reverse flotation as a beneficiation method to remove discoloring impurities, such as graphite, from kaolin clays.

Flotation is a process of treating a mixture of finely divided mineral solids, such as a kaolin clay, suspended in a liquid to separate a portion of the solids from other finely divided mineral solids, such as impurities. In general, flotation comprises introducing a gas (or providing a gas in situ) into the liquid to produce a frothy mass containing certain of the solids on the top of the liquid, and leaving suspended (unfrothed) other solid components. Flotation is based on the general principle that introducing a gas into a liquid containing suspended solid particles of different materials causes adherence of some gas to certain suspended solids and not to others, making the particles having the gas adhered thereto "lighter than" the liquid and allowing them to rise to the top of the liquid to form a froth. Those minerals remaining at the bottom or within the liquid are generally referred to as the "tailings." Some minerals and associated gangue treated by flotation generally do not possess sufficient hydrophobicity or hydrophilicity to allow adequate separation using gas alone. Various chemical reagents are often employed in froth flotation to create or enhance the physical or chemical properties necessary to cause separation.

As one such example of a chemical reagent, collectors are generally used to enhance the hydrophobicity, and thus floatability, of different mineral values. Collectors should be able to (1) attach to the desired mineral species to the relative exclusion of other species present; (2) maintain attachment during turbulence, shear, or other forces associated with froth flotation; and (3) render the desired mineral species sufficiently hydrophobic to permit the desired degree of separation.

Additional chemical reagents may include depressants, pH regulators (such as lime and soda), dispersants, and various promoters and activators. Depressants are generally used to increase or enhance the hydrophilicity of various mineral species and, thus, depress their flotation. Promoters and activators increase or enhance the effectiveness of other reagents, such as collectors or depressants.

Froth flotation has been extensively practiced in the mining industry since at least the early twentieth century. In the typical or direct flotation scheme, the valuable or desired mineral(s) is floated away from the gangue, which is left in the tailings. In another flotation scheme known as reverse flotation, the undesired gangue is floated away from the valuable mineral(s), which are left in the tailings. As one example, sedimentary kaolin clays have been subjected to flotation processes to remove anatase, a titania-based impurity. See J. Miller, B. Tippin, and R. Pruett, *Nonsulfide Flotation Technology and Plant Practice*, in 1 Mineral Processing Plant Design, Practice and Control 1159 (A. L. Mular et al. eds., 2002).

Certain flotation processes used to produce kaolins of various brightness have been discussed in the art. For example, U.S. Pat. No. 5,883,029 appears to disclose improving the brightness of various ores, including kaolin, by atomization or direct fusion. U.S. Patent Publication Nos. 2008/0017552 and 2008/0029460 likewise appear to disclose modified resins for removing various impurities from mineral and metal ores using froth flotation. Sharad Mathur, "Kaolin Flotation," 256 J. Colloid & Interface Sci. 153 (2002) also discloses certain kaolin flotation methods. However, none of these references appear to disclose removing carbon impurities, such as graphite, from kaolin by reverse flotation.

High brightness kaolin clay has many uses in industrial applications. For example, deficiencies of barrier coating due to the presence of graphite may be decreased or eliminated by removing graphite impurities. Other industrial applications include, but are not limited to, using high brightness kaolin clays as a coating pigment in paper applications and as a filler in paper, paints, and ceramics.

SUMMARY OF THE INVENTION

This application generally discloses a higher brightness kaolin. In particular, the application discloses increasing the brightness of a kaolin product by removing carbon impurities such as graphite through reverse flotation. The efficiency of graphite removal may be quantified by a brightness improvement of the flotation product (e.g., kaolin clay concentrate). Any kaolin clay, or other particulate mineral, containing carbon impurities could be applicable to the carbon impurity removal methodology developed in the present invention. In one embodiment, the amount of removed carbon impurity may be about 0.01% or more. In another embodiment, the increase in brightness may be at least about 0.1 GEB unit. In a further embodiment, the methods disclosed herein remove about 50% or more of the carbon impurity from the kaolin.

Also disclosed herein is a method for producing high brightness kaolin comprising reverse flotation, and uses for high brightness kaolin.

DETAILED DESCRIPTION OF THE INVENTION

Kaolin Clay

The higher brightness kaolin clay disclosed herein comprises at least one kaolin clay. The skilled artisan will readily understand appropriate kaolin clays for use in the described inventions. In one embodiment, the at least one kaolin clay is chosen from conventional kaolin clays that provide the properties desired for any particular application, such as those in paper, ceramics, paint, plastics, or cements. In another embodiment, the at least one kaolin clay comprises kaolinite ($Al_2Si_2O_5(OH)_4$), a hydrous aluminum silicate, and at least one impurity. In a further embodiment, the at least one kaolin clay comprises kaolinite and at least one carbon impurity. In yet another embodiment, the at least one kaolin clay is any kaolin clay comprising at least one carbon impurity. In yet a further embodiment, at least one carbon impurity may be present in the at least one kaolin clay in an amount of about 0.01% or more. The at least one kaolin clay may be used in any one of various common forms. Exemplary forms of kaolin clays include, but are not limited to, platy or hyperplaty kaolin clay, airfloat kaolin clay, water-washed kaolin clay, delaminated kaolin clay, and calcined kaolin clay. Kaolin clay appropriate for the inventions disclosed herein also include wet processed grads of kaolin, including but not limited to water-washed kaolin and kaolin clays that have been wet processed before one or more calcinations.

The at least one carbon impurity may be any carbon species whose presence in the at least one kaolin clay is undesirable. In one embodiment, the at least one carbon impurity is graphite. In another embodiment, the at least one carbon impurity is an organic carbon maceral or particle. In a further embodiment, the at least one carbon impurity is a carbon particle that decreases the brightness of an at least one kaolin clay.

Reverse Flotation Processing

Methods for producing purified and/or high brightness kaolin clay are disclosed herein. In one embodiment, the method comprises forming at least one slurry of at least one kaolin clay comprising at least one graphite, performing at least one treatment step on the at least one kaolin clay slurry, subjecting the slurry to at least one reverse flotation with at least one frother, to remove at least a quantity of the at least one graphite from the at least one kaolin clay and forming at least one purified kaolin clay and at least one froth comprising the removed quantity of graphite, and separating the at least one froth from the at least one purified kaolin clay. In another embodiment, the method comprises forming at least one slurry of at least one kaolin clay comprising at least one carbon impurity, performing at least one treatment step on the at least one kaolin clay slurry, subjecting the slurry to at least one reverse flotation with at least one frother, to remove at least a quantity of the at least one carbon impurity from the at least one kaolin clay and forming at least one purified kaolin clay and at least one froth comprising the removed quantity carbon impurity, and separating the at least one froth from the at least one purified kaolin clay. In a further embodiment, the method comprises forming at least one slurry of at least one kaolin clay comprising at least one carbon impurity, performing at least one treatment step on the at least one kaolin clay slurry, subjecting the slurry to at least one reverse flotation, to remove at least a quantity of the at least one carbon impurity from the at least one kaolin clay and forming at least one purified kaolin clay and at least one froth comprising the removed quantity of carbon impurity, and separating the at least one froth from the at least one purified kaolin clay. In yet another embodiment, the method comprises forming at least one slurry of at least one kaolin clay comprising at least one carbon impurity, subjecting the slurry to at least one reverse flotation, to remove at least a quantity of the at least one carbon impurity from the at least one kaolin clay and forming at least one purified kaolin clay and at least one froth comprising the removed quantity of carbon impurity, and separating the at least one froth from the at least one purified kaolin clay.

In one embodiment, the method comprises forming a slurry comprising at least one kaolin clay. In one embodiment, the kaolin clay slurry is less than about 75% solids. In another embodiment, the kaolin clay slurry is less than about 50% solids. In a further embodiment, the kaolin clay slurry is less than about 25% solids. Formation of a slurry comprises the at least one kaolin clay may occur due to performing at least one treatment step, as described below.

In one embodiment, the method comprises performing at least one treatment step on the at least one kaolin clay or a slurry of the at least one kaolin clay. The at least one treatment step may occur before, during, or after a reverse flotation. In one embodiment, the at least one treatment step is performed before a reverse flotation. In another embodiment, the at least one treatment step is performed during a reverse flotation. In a further embodiment, the at least one treatment step is performed after a reverse flotation. In yet another embodiment, one or more treatment steps are performed before a reverse flotation and one or more additional treatment steps are performed during the reverse flotation.

In one embodiment, the at least one treatment step comprises treating or combining a slurry of the at least one kaolin clay with at least one treatment reagent. Examples of the at least one treatment reagent include, but are not limited to, collectors, depressants, pH regulators, dispersants, promoters, and activators. In one embodiment, the at least one treatment reagent comprises at least one collector. In another embodiment, the at least one treatment reagent comprises at least one depressant. In a further embodiment, the at least one treatment reagent comprises at least one frother. In yet another embodiment, the at least one treatment reagent comprises at least one pH regulator. In yet a further embodiment, the at least one treatment reagent comprises at least one dispersant. In still another embodiment, the at least one treatment reagent comprises at least one promoter. In still a further embodiment, the at least one treatment reagent comprises at least one activator. The skilled artisan will be aware of appropriate treatment reagents, now known or hereafter discovered, and quantities of treatment reagents appropriate for use in an at least one treatment step.

In one embodiment, the at least one promoter comprises at least one vegetable oil. Exemplary vegetable oils include, but are not limited to, soybean oil, canola oil, and peanut oil. In another embodiment, the at least one promoter comprises at least one vegetable oil biodiesel. Exemplary vegetable oil biodiesels include, but are not limited to, the methyl, ethyl, hexyl, 2-ethylhexyl esters of at least one vegetable oil. In a further embodiment, the at least one promoter comprises at least one hydrocarbon oil. Exemplary hydrocarbon oils include, but are not limited to, diesel oil and fuel oil. In yet another embodiment, the at least one promoter comprises at least one fatty acid. Exemplary fatty acids include, but are not limited to, oleic acid. In yet a further embodiment, the at least one promoter comprises at least one vegetable oil biodiesel and at least one fatty acid. In one embodiment, the ratio of at least one vegetable oil biodiesel and at least one fatty acid is about 5:1. In another embodiment, the ratio is about 1:5. In a further embodiment, the ratio is about 4:1. In a further embodiment, the ratio is about 3:1. In yet another embodiment, the ratio is from about 5:1 to about 1:5. In yet a further embodiment, the ratio is from about 3:1 to about 4:1. In one embodiment, the at least one promoter is present in an amount from about 0.125 to about 3 kg/ton. In another embodiment, the at least one promoter is present in an amount from about 0.125 and about 2.5 kg/ton. In a further embodiment, the at least one promoter is present in an amount less than about 3 kg/ton.

When the at least one treatment reagent comprises at least one promoter, the at least one treatment step may be referred to as "conditioning the slurry" or at least one conditioning step. In one embodiment, the conditioning step is carried out in a conditioning vessel. In another embodiment, the conditioning step is carried out for a time from about 30 seconds to about 10 minutes. In a further embodiment, the conditioning step is carried out at a temperature from about 1° C. to about 95° C. In yet another embodiment, the conditioning step is carried out at a pH of at least about 2.0.

In one embodiment, the at least one treatment step comprises treating or combining a slurry of the at least one kaolin clay with at least one treatment reagent chosen from at least one collector. In one embodiment, the at least one collector selectively attaches to the surface of carbon impurities, rendering the surface of the impurities hydrophobic and causing the carbon impurity particles to float in the froth zone. In another embodiment, the at least one collector has no affinity toward kaolin particles. In a further embodiment, the at least one collector has a greater affinity for carbon impurity particles than for kaolin particles. In one embodiment, the at least one collector is added in an amount less than about 2.0 kg/ton. In another embodiment, the at least one collector is added in an amount less than about 1.0 kg/ton. In a further embodiment, the at least one collector is added in an amount from about 0.5 to about 1.0 kg/ton. The skilled artisan will be aware of appropriate collectors for use in the described methods, which collectors may be now known or hereafter discovered.

The methods disclosed herein include subjecting a slurry of the at least one kaolin clay to at least one reverse flotation. Those skilled in the art will be aware of appropriate flotation processes for use with the methods described herein, which may be cells now known or hereafter discovered. In one embodiment, the at least one reverse flotation is performed using a flotation cell. An exemplary flotation cell includes, but is not limited to, a Denver D-12 flotation cell equipped with a 2.5 liter cell.

In one embodiment, reverse flotation comprises the addition of at least one gas to a slurry of at least one kaolin clay. In another embodiment, reverse flotation occurs naturally due to at least one impurity present in the at least one kaolin clay. In another embodiment, reverse flotation comprises the addition of at least one frother to a slurry of at least one kaolin clay. Frothers generally promote the creation of a semi-stable or stable froth and do not attach or adsorb onto mineral particles. Exemplary frothers include, but are not limited to, methyl isobutylcarbinol or a mixture of polypropylene glycol esters. In one embodiment, the at least one frother is added to a slurry of at least one kaolin clay in an amount of about 5 to about 50 g/ton. In another embodiment, the at least one frother is added in an amount of about 10 to about 25 g/ton. In yet another embodiment, the at least one frother is added in an amount of less than 50 g/ton. In yet a further embodiment, the at least one frother is added in an amount of less than 25 g/ton.

The at least one reverse flotation removes at least some quantity of carbon impurity from the slurry of at least one kaolin clay, forming at least one purified kaolin clay and at least one froth comprising the removed quantity of carbon impurity. The at least one froth may be separated from the at least one purified kaolin clay. In one embodiment, the at least one purified kaolin clay comprises about 10% or less carbon impurity than the at least one kaolin clay. In another embodiment, the at least one purified kaolin clay comprises about 40% or less carbon impurity than the at least one kaolin clay. In a further embodiment, the at least one purified kaolin clay comprises about 70% or less carbon impurity than the at least one kaolin clay. In yet another embodiment, the at least one froth is black in color. In yet a further embodiment, the at least one froth is a black hydrophobic scum. In still another embodiment, the removed quantity of the at least one carbon impurity is about 10% of the at least one carbon impurity. In still a further embodiment, the removed quantity of the at least one carbon impurity is about 40% of the at least one carbon impurity. In another embodiment, the removed quantity of the at least one carbon impurity is about 70% of the at least one carbon impurity. In a further embodiment, the at least one froth comprises the removed quantity of carbon impurity and at least one additional impurity.

In one embodiment, a black-colored froth from a kaolin flotation is prepared by a method comprising forming a slurry comprising at least one kaolin clay comprising at least one black-colored carbon impurity; subjecting the slurry to at least one reverse flotation, to remove a quantity of the at least one carbon impurity from the at least one kaolin clay, forming at least one purified kaolin clay and at least one froth comprising the removed quantity of carbon impurity; and, separating the black-colored froth from the at least one purified kaolin clay.

The methods of the present invention recover from the at least one kaolin clay comprising at least one carbon impurity an amount of carbon impurity that may be measurable on a volatile free basis. In one embodiment, the amount of carbon impurity recovered is less than about 10 ppb on a volatile free basis.

The methods disclosed herein produced a purified kaolin clay. In one embodiment, a purified kaolin clay is prepared by a method comprising forming a slurry comprising at least one kaolin clay comprising at least one carbon impurity; subjecting the slurry to at least one reverse flotation, to remove a quantity of the at least one carbon impurity from the at least one kaolin clay, forming at least one purified kaolin clay and at least one froth comprising the removed quantity of carbon impurity; and separating the at least one purified kaolin clay from the at least one froth.

Measuring Brightness

The efficacy of the methods disclosed herein may be quantified. In one embodiment, the efficacy of carbon impurity removal can be quantified by the brightness improvement of the flotation product (e.g., kaolin clay concentrate). Brightness may be measured using GEB brightness, which measures the blue light brightness in the kaolin at 456 nm wavelength relative to a MgO standard. See TAPPI Test Method 534. Those of skill in the art are aware of standardized GEB brightness measuring techniques that may be appropriate for quantifying brightness improvements. Other brightness measurements may also be used. In one embodiment, at least about 0.1 GEB unit of brightness gain is achievable by removing at least one carbon impurity from at least one kaolin clay. In another embodiment, the brightness gain is about 1.0 unit. In a further embodiment, the brightness gain is about 2.0 units.

Uses of High Brightness Kaolin Clay

The high brightness kaolin clay disclosed herein has many uses in industrial and other applications. In one embodiment, the high brightness kaolin clay disclosed is used as a coating pigment in paper applications. In another embodiment, the high brightness kaolin clay disclosed is used as a filler in applications including, but not limited to, paper, paints, and ceramics. In yet another embodiment, the high brightness kaolin clay disclosed is used as a barrier pigment in coated board.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contains certain errors resulting from the standard deviation found in the respective testing measurements.

The headers used in this specification are presented for the convenience of the reader and not intended limit the inventions described herein. By way of non-limiting illustration, examples of certain embodiments of the present disclosure are given below.

EXAMPLES

Example 1

A delaminated kaolin clay (XP01-6100 clay) with a shape factor of about 100 (as measured using the electrical conductivity method, apparatus, and equations generally described in U.S. Pat. No. 5,576,617) containing 0.16% carbon graphite was added to a Denver D-12 flotation cell equipped with a 2.5 liter cell. About 1.0 lb/ton of a promoter comprising a blend of 75% Olecal C-102 biodiesel (Lambent Technologies) and 25% oleic acid (Union Camp) was added and the kaolin clay conditioned for 5 minutes. The impeller speed was 1500 rpm and the solids content of the slurry was 25%. Aerofroth 65, a conventional frother comprised of a mixture of polypropylene glycol esters provided by Cytec, was added at 20 g/ton to commence graphite flotation, which proceeded for 1 minute. The froth containing impurities including carbon graphite was then separated from the purified kaolin clay. The GEB brightness and total carbon were then measured and compared to the original kaolin clay, as shown below in Table 1. The sample showed both improved brightness and a reduction in graphite content after the reverse flotation.

TABLE 1

|  | Kaolin Before Reverse Flotation | Kaolin After Reverse Flotation | Difference |
|---|---|---|---|
| GEB Brightness | 84.67 | 86.69 | 2.02 |
| Carbon (wt %) | 0.16 | 0.05 | 0.11 |

Example 2

A delaminated kaolin clay (XP01-6100 clay) with a shape factor of about 100 (as measured using the electrical conductivity method, apparatus, and equations generally described in U.S. Pat. No. 5,576,617) containing 0.16% carbon graphite was added to a Denver D-12 flotation cell equipped with a 2.5 liter cell. 0.98 lb/ton of a promoter comprising a blend of 75% Olecal C-102 biodiesel (Lambent Technologies) and 25% oleic acid (Union Camp) was added and the kaolin clay conditioned for 5 minutes. The impeller speed was set at 1500 rpm, and the solids content of the slurry was 22.8%. Aerofroth 65, diluted to 1.25% solution in water, was added at 0.008 lbs/ton to commence carbon/graphite flotation, which proceeded for 1 minute. The froth containing carbon graphite was then separated from the purified kaolin clay. The GEB brightness was then measured and compared to the original kaolin clay. The resulting clay was then run through the same conditioning/flotation process a second time, to simulate cleaner cells. The GEB brightness and carbon content were then measured and compared to the original kaolin clay and to the kaolin clay after one pass. The sample showed further improved brightness after the second reverse flotation, as shown below in Table 2.

TABLE 2

|  | Kaolin Before Reverse Flotation | Kaolin After Reverse Flotation (1$^{st}$ Pass) | Kaolin After Reverse Flotation (2$^{nd}$ Pass) | Total Difference After Second Pass |
|---|---|---|---|---|
| GEB Brightness | 84.45 | 85.85 | 86.41 | 1.96 |
| Carbon (wt %) | 0.16 | Not Measured | 0.08 | 0.08 |

What is claimed is:

1. A method for purifying a delaminated kaolin clay comprising at least one carbon impurity, the method comprising:

forming a slurry comprising the delaminated kaolin clay;

performing at least one treatment step on the slurry;

subjecting the slurry to at least one reverse flotation, to remove a quantity of the at least one carbon impurity from the delaminated kaolin clay, forming at least one purified kaolin clay and at least one froth comprising the removed quantity of carbon impurity; and separating the at least one froth from the at least one purified kaolin clay, wherein the at least one carbon impurity comprises graphite.

2. The method according to claim 1, wherein the at least one treatment step comprises conditioning the slurry with at least one promoter.

3. The method according to claim 2, wherein the at least one promoter comprises at least one oil selected from the group consisting of at least one vegetable oil and at least one vegetable oil biodiesel.

4. The method according to claim 3, wherein the at least one vegetable oil is selected from the group consisting of soybean oil, canola oil, and peanut oil.

5. The method according to claim 3, wherein the at least one vegetable oil biodiesel is selected from the group consisting of methyl, ethyl, hexyl, 2- ethylhexyl esters of at least one vegetable oil chosen from soybean oil, canola oil, and peanut oil.

6. The method according to claim 3, wherein the at least one promoter further comprises at least one fatty acid.

7. The method according to claim 6, wherein the at least one fatty acid is oleic acid.

8. The method according to claim 1, wherein the at least one reverse flotation comprises adding at least one frother to the slurry.

9. The method according to claim 8, wherein the at least one frother is selected from the group consisting of methyl isobutylcarbinol or a mixture of polypropylene glycol esters.

10. The method according to claim 1, wherein the at least one purified kaolin clay exhibits improved GEB brightness by at least 0.1 unit over the delaminated kaolin clay comprising at least one carbon impurity.

11. The method according to claim 10, wherein the at least one purified kaolin clay exhibits improved GEB brightness by at least 1.0 unit over the delaminated kaolin clay comprising at least one carbon impurity.

12. The method according to claim 11, wherein the at least one purified kaolin clay exhibits improved GEB brightness by at least 2.0 units over the delaminated kaolin clay comprising at least one carbon impurity.

13. The method according to claim 1, wherein the removed quantity of the at least one carbon impurity is about 10% of the at least one carbon impurity.

14. The method according to claim 13, wherein the removed quantity of the at least one carbon impurity is about 40% of the at least one carbon impurity.

15. The method according to claim 14, wherein the removed quantity of the at least one carbon impurity is about 70% of the at least one carbon impurity.

16. A method for purifying a delaminated kaolin clay comprising at least one carbon impurity, the method comprising:
forming a slurry comprising the delaminated kaolin clay;
subjecting the slurry to at least one reverse flotation, to remove a quantity of the at least one carbon impurity from the delaminated kaolin clay, forming at least one purified kaolin clay and at least one froth comprising the removed quantity of carbon impurity; and,
separating the at least one froth from the at least one purified kaolin clay,
wherein the at least one carbon impurity comprises graphite.

17. A method for purifying a delaminated kaolin clay comprising at least one carbon impurity, the method comprising:
forming a slurry comprising the delaminated kaolin clay;
performing at least one treatment step on the slurry;
subjecting the slurry to at least one reverse flotation, to remove a quantity of the at least one carbon impurity from the delaminated kaolin clay, forming at least one purified kaolin clay and at least one froth comprising the removed quantity of carbon impurity; and
separating the at least one froth from the at least one purified kaolin clay,
wherein the at least one treatment step comprises conditioning the slurry with at least one promoter, and
wherein the at least one promoter comprises a vegetable oil biodiesel and a fatty acid.

18. The method according to claim 17, wherein the at least one carbon impurity comprises graphite.

* * * * *